United States Patent [19]

Ollila

[11] Patent Number: 5,081,938
[45] Date of Patent: Jan. 21, 1992

[54] METHOD AND APPARATUS FOR CONTROLLED BIDIRECTIONAL FEEDING OF PARTICULATE MATTER

[75] Inventor: Harry Ollila, Kauniainen, Finland
[73] Assignee: A. Ahlstrom Corporation, Karhula, Finland
[21] Appl. No.: 631,726
[22] Filed: Dec. 20, 1990
[51] Int. Cl.$^5$ ............................................. F23H 11/00
[52] U.S. Cl. .................... 110/269; 110/245; 110/329; 122/4 D; 198/804; 414/157
[58] Field of Search ............... 110/329, 269, 245, 341, 110/347; 122/4D; 198/804; 414/157, 162

[56] References Cited

U.S. PATENT DOCUMENTS

| | | | |
|---|---|---|---|
| 4,864,944 | 9/1989 | Engstrom eet al. | 122/4 D |
| 5,005,528 | 4/1991 | Virr | 122/4 D |
| 5,014,652 | 5/1991 | Hyldgaard | 122/4D |

FOREIGN PATENT DOCUMENTS

| | | | |
|---|---|---|---|
| 631225 | 5/1936 | Fed. Rep. of Germany | 110/269 |
| 2073123 | 10/1981 | United Kingdom | 198/804 |

*Primary Examiner*—Edward G. Favors
*Attorney, Agent, or Firm*—Nixon & Vanderhye

[57] ABSTRACT

A method and apparatus are provided for effecting bidirectional feeding of particulate material, such as in the bidirectional feeding of fuel to a circulating fluidized bed combustor. A feeder has a housing with at least one inlet in the upper portion of the housing and a chain and flight (drag chain) conveyor disposed within the housing. An intermediate plate is disposed between the upper and lower runs of the chain and flight conveyor and cooperates with the flights in the upper run so that the upper run conveys solid material in a first direction along the intermediate plate. A bottom plate is disposed below the lower run and cooperates with the lower run flights to convey solid material in a second direction opposite the first direction. First and second outlets are provided for the solid material, the first outlet at one end of the housing, and the second outlet at the other end of the housing. At least one opening is disposed in the intermediate plate for allowing a portion of the solid material being conveyed to flow through the opening to the lower run of the conveyor. The size and/or of the opening is adjustable to control the proportion of solid material flowing down to the lower opening, the opening preferably being adjustable so that it has about 30–70% of the width of the intermediate plate.

20 Claims, 3 Drawing Sheets

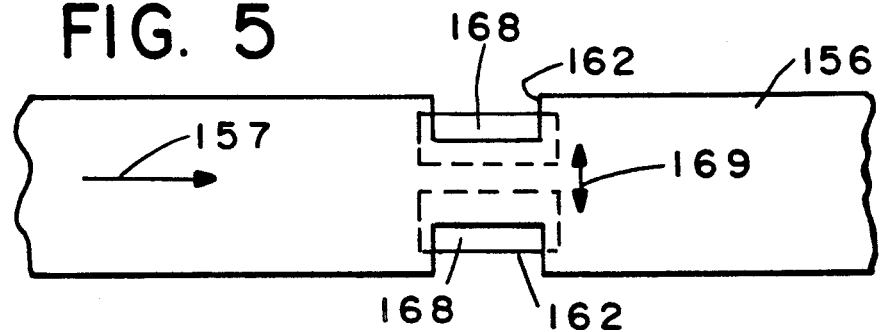
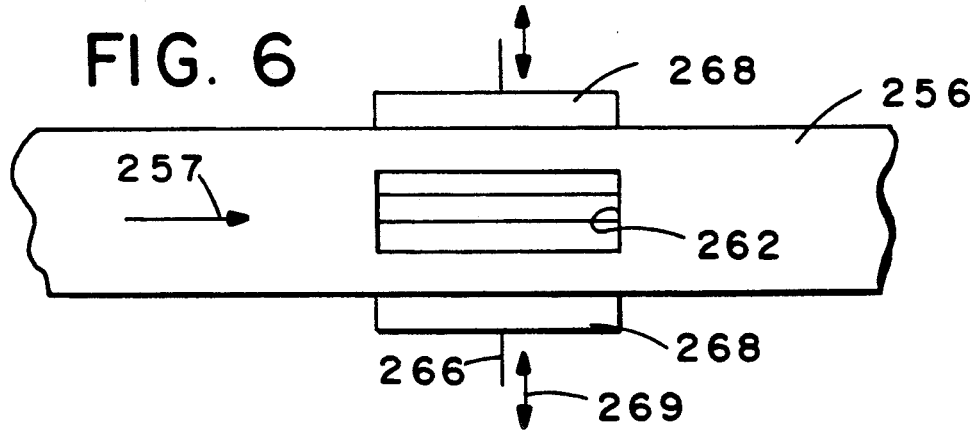
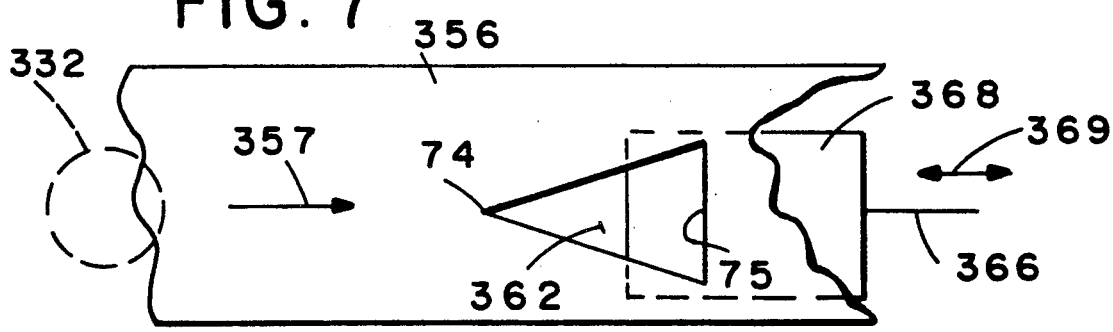

METHOD AND APPARATUS FOR CONTROLLED BIDIRECTIONAL FEEDING OF PARTICULATE MATTER

BACKGROUND AND SUMMARY OF THE INVENTION

The present invention relates to a method and an apparatus for controlled bidirectional feeding of particulate material. This invention relates more specifically to a bidirectional feeder for delivering solid material or materials in desired proportions from one or multiple inlets simultaneously to at least two feeding points. Such bidirectional feeders generally consist of a housing, having one or more inlets, a chain and flight conveyor, and at least two outlets from the housing.

Modern combustion or gasification processes, e.g. in circulating fluidized bed reactors, can utilize a wide range of solid fuels. Different types of fuels can be burnt or gasified simultaneously or alternatively. Properties of the fuels (even properties of one particular fuel) may, however, vary greatly. Therefore a fuel feeding system which is capable of reliably handling varying types or amounts of fuels, has long been needed.

Large combustion or gasification chambers require at least two fuel feeding points in order to ensure stable and efficient combustion or gasification and low emissions. A fuel feeding system that is able to deliver fuel at two feeding points simultaneously is therefore desired. The fuel feeding rate to each feeding point should be easily adjustable for different kinds of fuels in order to be able to control and optimize the combustion or gasification and emission performances.

Especially large circulating fluidized bed reactors often have two gas outlets in the upper part of the reactor chamber and two parallel cyclones for separating solids from the discharged gases. The separated solids are recycled distinctly from each cyclone back to the lower part of the reactor chamber, normally through a loop seal. Fuel is usually fed into the system through feeding points in the loop seal. In many cases, for layout reasons for example, it is desirable to first bring the fuel to a location somewhere in the middle between the two loop seals and only thereafter divide the flow of fuel between the two feeding points in the loop seals.

Various systems have been used for feeding solid fuels to two feeding points at the same time. Currently bidirectional screw feeders and drag chain conveyors are used for feeding solid material from one location in two opposite directions. Existing conveyors have some disadvantages. For example, it is difficult in bidirectional screw feeders, used to feed fuel from a hopper into two different feeding points, to reliably control the separate flows of material to each outlet. One reason is that screw feeders tend to block easily. Further, support of long screws has proven to be difficult, which leads to excess wear of bearings. Simultaneous feeding of different solid materials with the screw feeder without mixing in advance is difficult as the screw feeders have only one inlet.

In general, drag chain conveyors (chain and flight conveyors) have proven to be a relatively reliable solution to the problem of conveying different kinds of fuels. Existing drag chain conveyors do not, however, meet all requirements for reliably conveying fuel to two feeding points. Most drag chain conveyors have an inlet located at the end of the conveyor, which does not allow fuel to be fed from the inlet in two opposite directions, e.g. from a location in the middle between two loop seals to both loop seals.

Solid material delivered from a hopper through a vertical downwardly directed duct on top of a drag chain conveyor is not automatically spread evenly on the conveyor. The material tends to flow unsteadily in the duct, flowing along one side or the other of the duct. Pressure differences in the system easily cause changes in the material flow. Even relatively small changes in the composition of the solid material may also change the flow properties of the solid material. It is therefore very difficult to divide the flow of solid material evenly into two or more predetermined flows immediately at the outlet of the duct, or at the inlet to the conveyor housing. The total amount of solid material, as well as, proportions of the individual, divided, solid material flows, will vary.

The present invention addresses the problem of feeding solid material in two opposite directions and in predetermined proportions or controlled amounts, e.g. into combustors or gasifiers or some other systems needing a controlled feed of solid material to at least two feeding points.

According to one aspect of the present invention a feeder for bidirectional feeding of solid material is provided. The feeder comprises: A housing having an upper portion, and at least one inlet for solid material in the upper portion. A drag chain conveyor with flights for conveying solid material longitudinally in the housing, the conveyor being primarily disposed within the housing, and having an upper run and a lower run. An intermediate plate is disposed between the upper run and the lower run and cooperates with the flights of the upper run so that the conveyor conveys solid material along the intermediate plate in a first direction. A bottom plate associated the housing cooperates with the scrapers of the lower run so that the scrapers of the lower run convey solid material along the bottom plate in a second direction opposite the first direction. At least first and second outlets for solid material from the housing are provided, the outlets spaced from each other in the first direction, and disposed on opposite sides of the at least one inlet. And, means defining at least one opening in the intermediate plate between the at least one inlet and the first outlet for allowing a portion of the solid material being conveyed in the first direction to flow through the opening to the lower run of the conveyor, is provided. The dimensions of the opening in the intermediate plate are adjustable to control the amount of solid material that falls from the upper run to the lower run.

The intermediate plate is preferably arranged under the inlet(s) so as to receive all solid material flowing into the housing through the inlets. The intermediate plate is further arranged to reach from the inlet(s) substantially to a first end of the conveyor, thus enabling transport of material from the inlet(s) to a first outlet in the conveyor. The width of the intermediate plate is approximately the width of the housing, thus preventing solid material from falling down at the sides of the upper run of the conveyor.

The opening in the intermediate plate is e.g. adjustable perpendicularly to the running direction of the conveyor, being approximately 30–70% of the total width of the intermediate plate. In most cases, when a solid material flow has to be divided into two equal portions, the width of the opening will be about 50% of the total width of the intermediate plate. The width of the opening may, however, depend on e.g. location of solid material inlet(s) and the location of the opening in the intermediate plate.

The opening may be arranged at either side of the intermediate plate, or two openings may be provided— one at each side of the intermediate plate. The opening can alternatively be arranged in the middle of the intermediate plate. The form of the opening may be rectangular or triangular or any suitable form having a size which can conveniently be adjusted.

Different arrangements for controlling the size of the opening (or rather the amount of solid material flowing through the opening down to the lower run of the conveyor) may be provided. Preferably a gate valve is arranged to shut off or widen the opening. The gate valve may, e.g., be a sliding plate arranged below the intermediate plate in connection with the opening. The position of the plate may be controlled to shut off one part of the opening or the whole opening.

The invention allows the solid material to be divided into two predetermined proportions at a distance from the inlet(s), thus giving the solid material time to form a continuous and even layer of solid material on the upper run before it is to be divided and led to the outlets.

A spreader may be arranged between the solid material inlet(s) and the adjustable opening above the upper run of the conveyor in order to help level out the solid material flowing on the intermediate plate. The spreader ensures an even flow of solid material along the intermediate plate and makes division of solid material in predetermined proportions easier. The distance needed to spread the solid material evenly on the upper run is shortened if a spreader is used. The spreader may also be used to control the total flow of solid material from the inlet(s) towards the adjustable opening as it may form a barrier allowing only a predetermined maximum flow of solid material to flow along the intermediate plate. The spreader may be adjustable to allow more or less material to flow along the upper run. Different types of spreaders are known and can be used. The spreader may be a beam transversely arranged above the conveyor, or it may have the form of a plough.

According to another aspect of the present invention, a circulating fluidized bed reactor is provided. The reactor comprises: A combustion chamber. A pair of ducts for feeding solid particulate material into the combustion chamber adjacent the bottom thereof. Means for simultaneously feeding solid material to be introduced into the combustion chamber to the ducts, the feeding means comprising: a housing having an upper portion, and at least one inlet for solid material in said upper portion; a drag chain conveyor with flights for conveying solid material longitudinally in the housing, the conveyor being primarily disposed within the housing, and having an upper run and a lower run; an intermediate plate disposed between the upper run and the lower run and cooperating with the flights of the upper run so that the conveyor conveys solid material along the intermediate plate in a first direction; a bottom plate associated with the housing cooperating with the scrapers of the lower run so that the scrapers of the lower run convey solid material along the bottom plate in a second direction opposite the first direction; at least first and second outlets for solid material from the housing, the outlets spaced from each other in the first direction, and disposed on opposite sides of the at least one inlet; and, means defining at least one opening in the intermediate plate between the at least one inlet and the first outlet for allowing a portion of the solid material being conveyed in the first direction to flow through the opening to the lower run of the conveyor. One of the outlets is connected to each of the ducts.

According to still another aspect of the present invention, a method for controlled feeding of solid material bidirectionally is provided. The method comprises the steps of: Introducing solid material into the opening of the housing to fall down onto the intermediate plate. Conveying the material with the top run on the intermediate plate in the first direction toward the first outlet. Adjusting the size of the opening in the intermediate plate to proportion the amount of material that will fall through the opening to the bottom plate. And, conveying the material on the bottom plate with a lower run of the conveyor to the second outlet. The method may also comprise the step of providing adjustable spreading action to control the solid material flow on the upper run of the conveyor.

It is the primary object of the present invention to provide an effective method and apparatus for delivering solid material to two or more different feeding points, in which the disadvantages of the prior art are minimized. This and other objects of the invention will become clear from the detailed description of the invention and the appended claims.

BRIEF DESCRIPTION OF THE DRAWINGS

FIG. 5 is a top schematic view of another embodiment of intermediate plate with adjustable openings according to the present invention; and FIGS. 6 and 7 are still further embodiments of other alternatives of the intermediate plate and openings that can be utilized according to the invention.

DETAILED DESCRIPTION OF THE DRAWINGS

Figure 1:
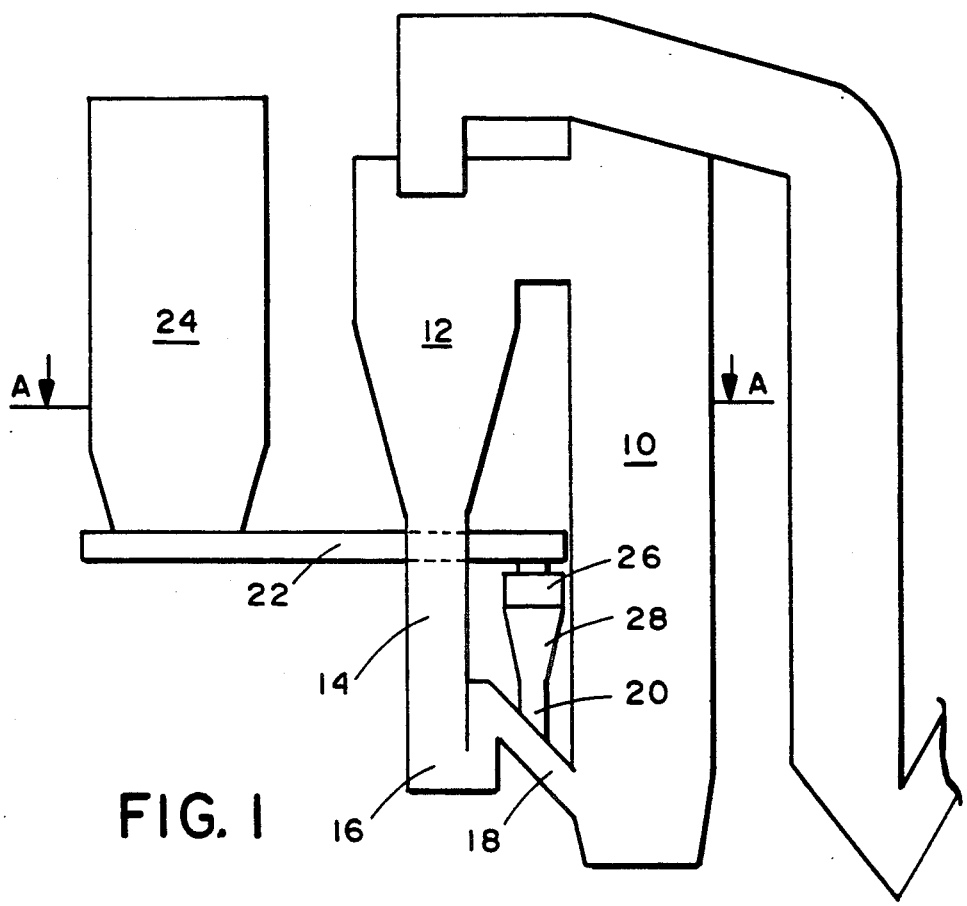
FIG. 1 is a schematic drawing of an exemplary circulating fluidized bed system having a solid material feeder system in accordance with the present invention.
Figure 2:
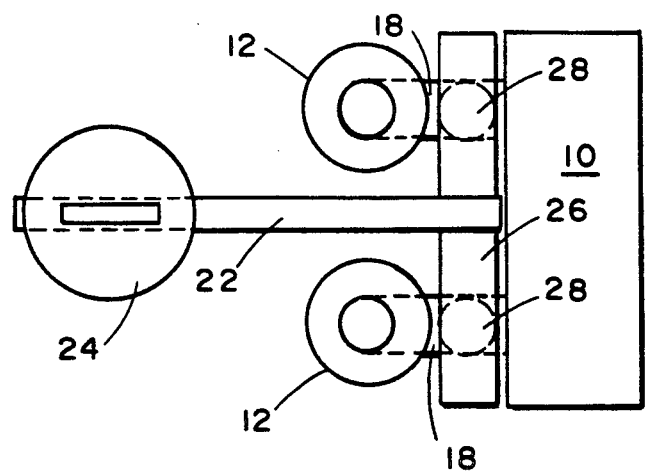
FIG. 2 is a partial cross-sectional view of FIG. 1 taken along lines A—A thereof.

FIG. 1 and FIG. 2 show a circulating fluidized bed combustor having a combustion chamber 10, two cyclones 12 for separating particles from the flue gases, and two standpipes 14 for recycling separated particles from the cyclones to the lower part of the combustion chamber 10. Each standpipe 14 is connected via a loop seal 16 and a duct 18 to the combustion chamber 10. The loop seals 16 prevent gases from flowing from the combustion chamber into the standpipes 14. Each duct 18 connecting the loop seals 16 with the combustion chamber 10 is connected to one of two feeding points 20 for fuel.

A conveyor 22 is arranged to feed fuel from a fuel silo 24 to a bidirectional feeder 26 construed in accordance with the invention, and arranged between the two standpipes 14. Outlets 28 in the opposite ends of the bidirectional feeder 26 extend to a location substantially above the two ducts 18 in the loop seals 16. The outlets 28 are connected to the respective feeding points 20.

Fuel particles are fed from the silo 24 through the conveyor 22 into the bidirectional feeder 26, where the flow of fuel is divided into two predetermined flows of fuel being conveyed into the opposite ends and outlets 28 of the feeder. Fuel is led from the outlets 28 to either of two feeding points 20. From the feeding points 20 the fuel is introduced into the flow of circulating solid particles in ducts 18.

The circulating fluidized bed combustor can utilize a wide range of different fuels. A change in fuel quality usually leads to a need to change other combustion parameters. These changes usually also lead to a need to change the feeding rate of fuel into the separate feeding points. There has not—until now—been a satisfactory way of controlling the feeding of fuel at the different feeding points.

The bidirectional feeder 26 constructed according to the present invention provides a mechanism for controlling the fuel feed into the different feeding points in a simple way. The bidirectional feeder 26 shown in FIG. 3 and FIG. 4 comprises an elongated housing 30 with two or more solid material inlets 32 and 34 in its upper part, located between two solid material outlets 28a and 28b in its lower part at the opposite ends 38, 40 of the housing 30. A drag chain conveyor system 42 (chain and flight conveyor) for conveying solid material, such as fuel, from the inlets 32, 34 to the outlets 28a, 28b is arranged in the housing 30. The outlets 28a, 28b are connected to separate feeding points 20 in separate loop seals 16 in the circulating fluidized bed combustor.

The conveyor 42 includes a pair of endless chains 44 to which transverse flights 46 are connected, longitudinally spaced apart from each other. The lengths of the flights 46 are adapted to approximate the width of the housing 30, the flights 46 substantially reaching from one sidewall 48 to another sidewall 50. The chains 44 are arranged to be driven by a drive wheels 52 at one end 38 of the housing 30, and to go around an idler wheels 54 at the other end 40 of the housing 30.

The conveyor 42 may alternatively be construed so that the ends of the conveyor 42 reach out from the conveyor housing 30, allowing the drive wheels 52 and idler wheels 54 to be arranged exteriorly of the conveyor housing 30.

The conveyor system 42 is divided, by an intermediate plate 56 arranged close to and under the upper run of the chains 44, into an upper run 58 and a lower run 60. The plate 56 is disposed directly under the inlets 32, 34 and reaches lengthwise downstream substantially to the first outlet 28a. The plate 56 extends substantially the width of the housing 30. The chains 44 and the flights 46 transport material both in the upper run 58 and in the lower run 60, but in opposite directions, as indicated by arrows 57, 59. In the lower run 60 the solid material is conveyed with the chains 44 and flights 46 along a bottom plate 61 of or associated with the housing 30. In the upper run 58 solid material is conveyed from the inlets 32, 34 towards the first outlet 28a in the first direction (of arrow 57), and in the lower run 60 solid material is conveyed in the opposite direction (second direction, of arrow 59) to the other outlet 28b in the opposite end 40 of the housing 30.

An adjustable opening 62 is arranged in the intermediate plate 56 between the inlets 32, 34 and the first outlet 28a. The width of the opening 62, transversly to the running direction of the chains 44, is smaller than the width of the housing 30. The width of the opening 62 can be adjusted in order to control the portion of material which drops down to the lower run 60. The adjustment can be arranged, for example, by a gate valve 66. The gate valve 66 may comprise a sliding plate 68 disposed under the intermediate plate 56. The sliding plate 68 is movable in a direction (see arrows 69 in FIG. 4) transversely to the flowing direction of the solid material and may thereby decrease or increase the width of the opening 62.

Solid material introduced through the inlets 32, 34 falls down on the intermediate plate 56. The chains 44 and flights 46 in the upper run 58 transport the material on the intermediate plate towards the outlet 28a. When the solid material reaches the opening 62 in the plate 56, a portion of the material drops through the opening 62 down to the lower run 60, while the rest of the material is transported further along the upper run 58 to the outlet 28a in direction 57.

The material, which drops through the opening 62 to the lower run 60, is transported in an opposite direction (59) along the bottom plate 61 to the second outlet 28b at the end 40 of the housing 30.

Solid material which is fed from the inlets 32, 34 onto the intermediate plate 56, may spread unevenly on the plate 56, especially when the properties of the fuel vary. During the transportation from the inlets 32, 34 towards the adjustable opening 62 the solid material may level out on the upper run 58. The flights 46 and chains 44 help to spread the material relatively evenly during transportation. The opening 62 is therefore preferably arranged at a certain distance from the inlets 32, 34 in order to give the solid material enough time to level out during the transportation. The material should be presented evenly to the opening 62, where it is divided into two flows, one to continue on the upper run 58 and the other to flow in the opposite direction on the lower run 60. An even distribution of the material on the intermediate plate 56 ensures that material is divided in the right proportions between the upper run 58 and the lower run 60, and thus between the first and the second outlets 28a, 28b.

An additional equalizer or spreader 70 can be provided between the inlets 32, 34 and the opening 62 in order to enhance leveling of the material evenly in the upper run 58. The equalizer 70 reduces the distance between the inlets 32, 34 and the opening 62, which is required for achieving an even distribution of material.

The location of the opening 62 in the intermediate plate 56 in relation to the outlets 28a, 28b can be arranged so that the material from one inlet (e.g. 32) has the same travelling time to each outlet 28a, 28b. This is achieved, when the distance from the opening 62, i.e. the position where material is dropped onto the lower run 60, is the same to both outlets 28a and 28b. Then all changes in input of material, flow rate and/or quality are observed at the same time at both outlets 28a, 28b, even if the material flow is controlled by material height.

Typically about half of the conveyed material is dropped down to the lower run 60, so that only about half of the material on the upper run 58 is transported to the first end 38 of the conveyor 42. In the lower run 60, respectively, only the other half of the material flows to the end 40 of the conveyor 42. By being able to decrease the amount of solid material being transported to the ends 38, 40 of the conveyor 42 it is possible to minimize the risk of blockages of the conveyor 42 close to the driving wheels 52 and the idler wheels 54, where blockages are most likely to occur. This raises the reliability of the conveyor 42.

Figure 3:
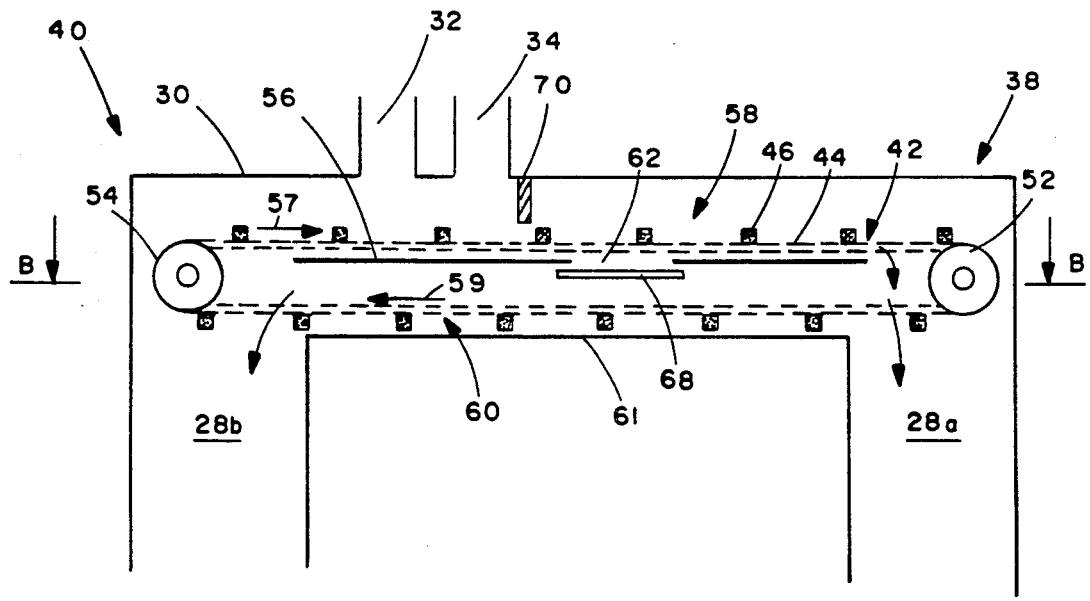
FIG. 3 is a schematic illustration of a conveyor according to the present invention utilizable in the circulating fluidized bed system of FIG. 1.
Figure 4:
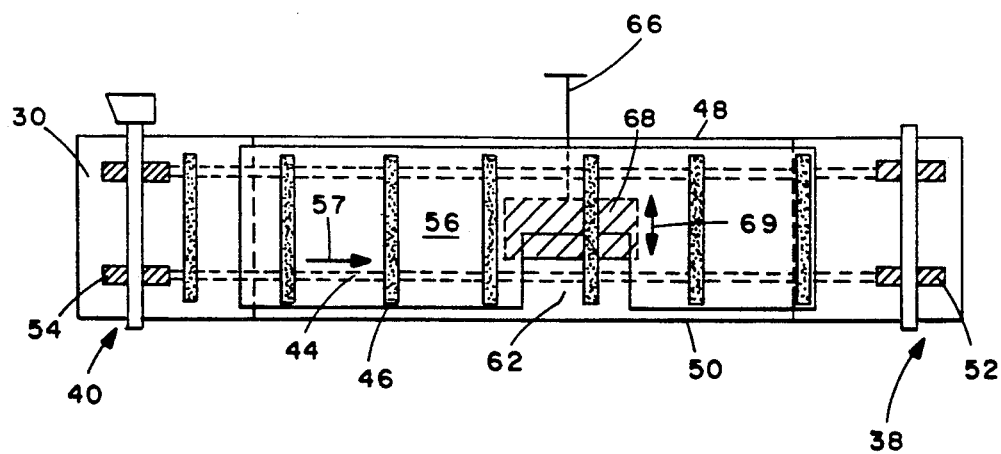
FIG. 4 is a cross-sectional view of FIG. 3 taken along lines B—B thereof.

There may be several inlets 32, 34 in the conveyor housing 30, as shown in FIG. 3. Different inlets may be used for feeding different fuels and for feeding other particles (e.g. sulphur absorbing agents). The inlets 32, 34 may be located at various places above the conveyor 42 and the intermediate plate 56 in the upper part of the housing 30, but preferably well ahead of the opening 62, where part of the material has to be dropped down to the lower run 60. The distance from the inlet(s) 32, 34 to the opening 62 should be long enough to allow the material to spread by itself evenly on the intermediate plate 56 during transportation. The flexible location on the inlets simplifies the general arrangement of the feeding system. The system is not dependent on an even flow of material at the inlets, as the solid material is allowed to settle to a steady layer on the conveyor before it is divided into different proportions. The present invention provides a method for eliminating disturbing fluctuations in solid material feed.

FIGS. 5 through 7 schematically illustrate different forms that the intermediate plate and the opening or openings therein can take. The conveyors, housing, and like components are not illustrated in these figures for ease of description, but are comparable to those in the FIGS. 3 and 4 embodiment. In the FIG. 5 embodiment structures comparable to those in the FIGS. 3 and 4 embodiment are shown by the same reference numeral only preceded by a "1", in the FIG. 6 embodiment structures comparable to those in the FIGS. 3 and 4 embodiment are shown by the same reference numeral only preceded by a "2", and in the FIG. 7 embodiment structures comparable to those in the FIGS. 3 and 4 embodiment are shown by the same reference numeral only preceded by a "3".

In FIG. 5 the intermediate plate 156 has two openings 162 formed therein, along the width-wise edges thereof. A pair of gate valve plates 168 may be disposed in association with the openings 162 and movable in the direction of arrows 169 to adjust the size of the openings 162.

In FIG. 6, the intermediate plate 256 has a centrally located generally rectangular opening 262 therein. The opening 262 in the middle of the plate 256 may be associated with two gate valves 266 having plates 268 associated therewith which are movable in the dimension of arrows 269 from either side of the rectangular opening 262 to adjust the dimensions thereof.

FIG. 7 illustrates an intermediate plate 356 with a generally rectangular opening 362 therein, disposed in approximately the middle thereof. The opening 362 preferably is constructed so that it has an apex 74 which is the closest part of the opening 362 to the inlet 332, the triangular shaped opening 362 having a base 75 which is generally perpendicular to the first direction of conveyance 357, and opposite the apex 74. A sliding plate 368 of gate valve 366 preferably is movable into the opening 362 from the base 75 thereof to control the dimension thereof. Of course other shapes and positions of the openings in the intermediate plate may be provided in order to achieve particular objectives in a given installation.

The invention may be used not only for feeding particulate fuel to combustors or gasifiers, but may e.g. be used for feeding particulate material for the manufacturing of fiberboards or particulate boards, or in like processes.

While the invention has been described in connection with what is presently considered to be a most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for effecting controlled feeding of solid material, comprising:
    a housing having an upper portion, and at least one inlet for solid material in said upper portion;
    a drag chain conveyor with flights for conveying solid material longitudinally in the housing, said conveyor being primarily disposed within said housing, and having an upper run and a lower run;
    an intermediate plate disposed between said upper run and said lower run and cooperating with said flights of said upper run so that said conveyor conveys solid material along said intermediate plate in a first direction;
    a bottom plate associated with said housing for cooperating with the flights of said lower run so that the flights of said lower run convey solid material along said bottom plate in a second direction opposite said first direction;
    at least first and second outlets for solid material from said housing, said outlets spaced from each other in said first direction, and disposed on opposite sides of said at least one inlet; and
    means defining at least one opening in said intermediate plate between said at least one inlet and said first outlet for allowing a portion of the solid material being conveyed in said first direction to flow through said opening to said lower run of said conveyor.

2. Apparatus as recited in claim 1 further comprising adjustment means associated with said opening in said intermediate plate for controlling the size of said opening and therefore the proportion of solid material flowing from said intermediate plate to said lower run.

3. Apparatus as recited in claim 2 wherein said adjustable opening in said intermediate plate has a width dimension which is transverse to said first flow direction, said width dimension being about 30–70% of the width of said intermediate plate.

4. Apparatus as recited in claim 3 wherein said adjustable opening is disposed on one side of said intermediate plate.

5. Apparatus as recited in claim 4 wherein said adjustable opening is rectangular in shape.

6. Apparatus as recited in claim 1 wherein said adjustable opening is disposed on one side of said intermediate plate.

7. Apparatus as recited in claim 1 wherein said adjustable opening is rectangular in shape.

8. Apparatus as recited in claim 1 wherein said adjustable opening is triangular in shape having an apex being the closest portion thereof to said at least one inlet, and having a base opposite said apex, said base being substantially perpendicular to said first direction.

9. Apparatus as recited in claim 8 wherein said adjustable opening is disposed in approximately the middle of said intermediate plate.

10. Apparatus as recited in claim 1 wherein said adjustable opening is disposed in approximately the middle of said intermediate plate.

11. Apparatus as recited in claim 2 wherein said means for adjusting said opening comprises a gate valve disposed underneath said intermediate plate and means for moving said gate valve to enlarge or decrease the size of said opening.

12. Apparatus as recited in claim 1 further comprising spreading means disposed above said upper run of said conveyor between said at least one inlet and said outlet disposed on the side of said inlet in said first direction.

13. A circulating fluidized bed combustor comprising:
   a combustion chamber;
   a pair of ducts for feeding solid particulate material into said combustion chamber adjacent the bottom thereof;
   means for simultaneously feeding solid material to be introduced into said combustion chamber to said ducts, said feeding means comprising: a housing having an upper portion, and at least one inlet for solid material in said upper portion; a drag chain conveyor with flights for conveying solid material longitudinally in the housing, said conveyor being primarily disposed within said housing, and having an upper run and a lower run; an intermediate plate disposed between said upper run and said lower run and cooperating with said flights of said upper run so that said conveyor conveys solid material along said intermediate plate in a first direction; a bottom plate associated with said housing for cooperating with the flights of said lower run so that the flights of said lower run convey solid material along said bottom plate in a second direction opposite said first direction; at least first and second outlets for solid material from said housing, said outlets spaced from each other in said first direction, and disposed on opposite sides of said at least one inlet; and means defining at least one opening in said intermediate plate between said at least one inlet and said first outlet for allowing a portion of the solid material being conveyed in said first direction to flow through said opening to said lower run of said conveyor; and
   one of said outlets connected to each of said ducts.

14. A combustor as recited in claim 13 wherein each of said ducts is connected by a loop seal to a standpipe, and wherein each standpipe is connected to a cyclone separator.

15. A combustor as recited in claim 14 wherein said feeding means is connected by a conveyor to a particle silo, said conveyor connected to said particle silo being operatively connected to said at least one inlet to said housing.

16. A combustor as recited in claim 13 wherein said feeding means is connected by a conveyor to a particle silo, said conveyor connected to said particle silo being operatively connected to said at least one inlet to said housing.

17. Apparatus as recited in claim 13 further comprising adjustment means associated with said opening and said intermediate plate for controlling the size of said opening and therefore the proportion of solid material flowing from said intermediate plate to said lower run.

18. Apparatus as recited in claim 17 wherein said adjustable opening in said intermediate plate has a width dimension which is transverse to said first flow direction, said width dimension being about 30-70% of the width of said intermediate plate.

19. A method for controlling the feed of solid material to one of two outlets disposed on opposite ends of a housing, the housing having a conveyor with an upper run cooperating with an intermediate plate having an opening therein, and a lower run cooperating with a solid bottom plate, the runs disposed in opposite first and second directions, the first direction being toward a first outlet, and the second direction toward a second outlet; said method comprising the steps of:
   introducing solid material into the opening of the housing to fall down onto the intermediate plate;
   conveying the material on the intermediate plate with the upper run in the first direction toward the first outlet;
   adjusting the size of the opening in the intermediate plate to proportion the amount of material that will fall through the opening to the bottom plate; and
   conveying the material on the bottom plate with the lower run of the conveyor to the second outlet.

20. A method as recited in claim 19 comprising the further step of providing adjustable spreading action to control the solid material flow on the upper run of the conveyor.

* * * * *